July 31, 1962  J. H. MUMMA  3,047,328
SELF-CLEARING SHOVEL AND ATTACHMENT
Filed May 31, 1961
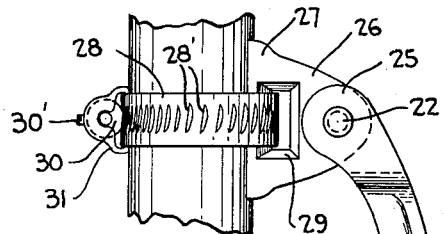
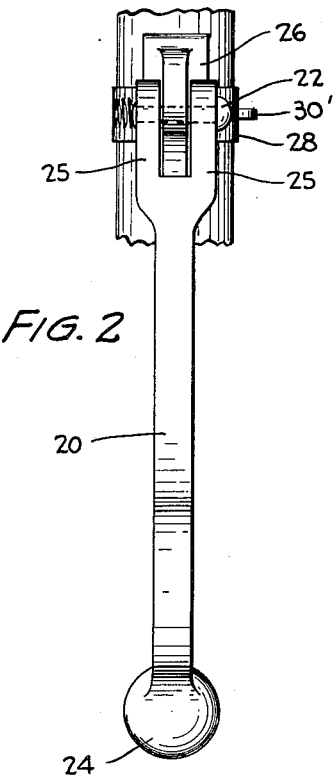
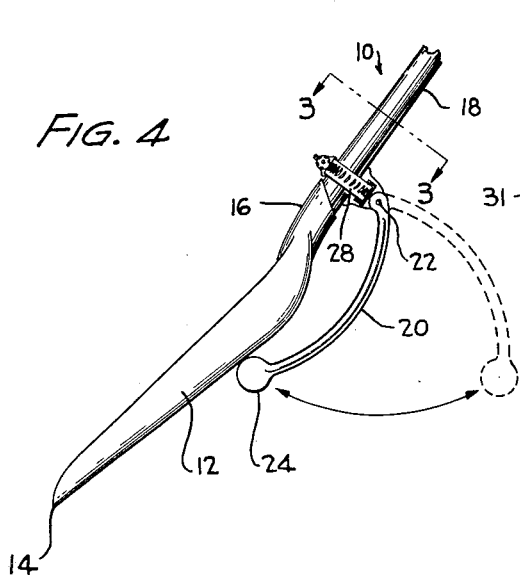
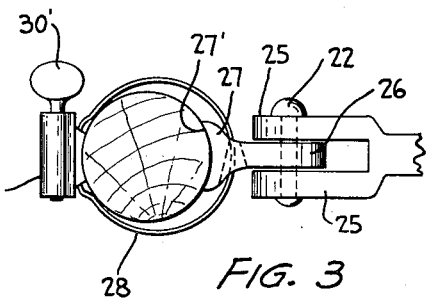
INVENTOR
JONAS H. MUMMA
BY Watson, Cole, Grindle & Watson
ATTORNEYS 3,047,328
SELF-CLEARING SHOVEL AND ATTACHMENT
Jonas H. Mumma, P.O. Box 263, Columbia, Pa.
Filed May 31, 1961, Ser. No. 113,788
3 Claims. (Cl. 294—59)

This invention relates to an attachment for a shovel to render the shovel self-clearing in use and to the combination including a conventional shovel having such an attachment applied thereto.

Attempts have heretofore been made to provide clearing attachments for shovels for the purpose of removing material such as snow, clay or the like, lifted by the shovels but tending to adhere to the shovel blade. Such attachments, however, have generally taken the form of scraping means of one sort or another for movement longitudinally along the upper surface of the blade to engage and remove from the blade by scraping, the material tending to adhere to it. These devices have been relatively complex in structure, expensive and difficult to manipulate.

It is a primary object of the present invention to provide a shovel clearing attachment and a shovel equipped therewith in which the attachment is automatically actuated by inertia responsive to the throwing action of the shovel incident to its manipulation. The invention involves an entirely different principle of operation than prior devices for the same purpose in that it automatically imparts to the shovel blade a sharp impact immediately at the end of the throwing stroke of the shovel and timed to impart vibrations to the shovel blade such as will loosen and free the material therefrom simultaneously with the normal tendency of the material to free itself by inertia incident to arresting of the throwing movement prior to return of the shovel for another operative stroke.

Generally speaking, the invention herein involves an attachment in the form of a rigid pendulum supported from a conventional shovel for swinging movement in the vertical plane of symmetry extending through the shovel handle and blade, about a fixed axis extending transversely to such plane of symmetry. The fixed axis about which the pendulum is thus swingable is positioned adjacent the upper or rear edge portion of the shovel blade and the pendulum preferably includes a weighted free end positioned to swing in said plane and to impact against the blade medially between its front and rear edge portions.

Further, the invention contemplates provision of an attachment adapted for easy application to conventional shovels.

In the accompanying drawing and the ensuing detailed description, the invention is exemplified as employed in connection with a snow shovel, though it is to be understood that it is not limited to use with any particular type of shovel and that the drawing and detailed description herein are merely illustrative in nature.

In the accompanying drawings:

FIGURE 1 is a front elevation of the invention as applied to a shovel handle, the latter being shown fragmentarily only;

FIGURE 2 is a side elevation of the structure shown in FIGURE 1, as seen from the right hand side of FIGURE 1;

FIGURE 3 is an enlarged cross section on the line 3—3 of FIGURE 4; and

FIGURE 4 is a view in side elevation on a reduced scale showing the invention as applied to a shovel, the handle of the shovel being broken away, and the attachment of the invention being shown in broken lines in one of its positions.

Referring now in detail to the accompanying drawing, the invention is shown in its preferred application to a snow shovel of conventional type comprising a generally rectilinear handle portion 10 and a blade 12 supported at the forward end of said handle portion, the blade being formed symmetrically to a vertical plane passing through the major longitudinal axis of the handle position 10 as is usual in order to maintain proper balance of the shovel. At its forward end the blade 12 is provided with a usual generally transverse working edge 14. As is usual in shovels of various types, the handle portion 10 extends from the rear edge of the blade 12 at an obtuse angle to the blade and is defined by the socket 16 receiving and supporting the blade 12 on the handle 18 of wood or other suitable rigid material.

Associated with such conventional structure is a rigid pendulum 20 which is suspended from the shovel for swinging movement about the afore said plane of symmetry about a fixed axis 22 extending transversely to said plane and located adjacent the rear end of the shovel blade. The pendulum preferbaly includes a weighted free end 24 and the length of the pendulum from its pivot 22 to its free end 24 is such that when the pendulum is operatively positioned on a shovel, the free end 24 will be located to impact against the medial portion of the shovel blade substantially midway between its front and rear edges and along the plane of symmetry thereof. The axis 22 is purposely fixed to guide and maintain the pendulum within this plane so that it will always impact against the shovel at the proper location.

It is obvious that the pivotal axis 22 between the pendulum and the shovel may be defined by any of a number of expedients. However, for purposes of exemplification, the axis 22 is defined by pivot pin extending between the relatively spaced legs 25 of a clevis formed at the upper end of the pendulum and also through the interposed plate portion 26 of a bracket 27, which is secured to the handle portion of the shovel adjoining the rear end edge of the blade 12. Thus it will be seen that the bracket 27 is provided with a cylindrically curved or recessed face 27' adapted to receive and be clamped in position against the handle portion 10. In the present instance the bracket is shown as being thus secured against the wooden handle 18 of the handle portion 10. In order to readily adapt the attachment for mounting on and removal from the conventional shovel, it is desirable to provide the bracket 27 with a cooperating circular clamp structure which passes around bracket 27 and through opening 29. This structure may conveniently comprise a conventional hose clamp band 28 having transverse openings 28' adjacent one end for cooperation in the manner of a worm gear with a worm 30, rotatably supported in a housing 31 at the other end of the band 28. Wings 30' at one end of the worm 30 facilitate manual rotation of the worm.

In the operation of a shovel equipped with such an attachment, as exemplified in the shoveling of snow, the shovel is moved forwardly along its plane of symmetry to scoop up a load of snow. During this time the pendulum 20 will be swung somewhat rearwardly by engagement with the snow or the surface of the ground therebeneath so that it will not interfere with the shoveling operation. The snow is then discharged from the shovel by a forward throwing movement of the shovel, terminated by relatively sharp retraction movement of the shovel. As the throwing movement is terminated and the retraction movement initiated, it will be seen that the momentum of the snow carried by the shovel will tend to break it loose from the blade whereby it may be discharged. However, in many instances where the snow is quite wet and sticky, it will tend to adhere to the shovel blade rather than be discharged. In the use of the present invention, however, it will be seen that at the same time the momentum of the snow exerts this force tending to remove it from the blade at the end of the throwing stroke, the forward momentum of the pendulum 20 will cause it to impact against the undersurface of the blade, imparting vibrations to the blade which will supplement this already existing action of the snow itself to break loose the adherence between the snow and the blade, whereby the snow is readily discharged. The invention thus operates without any deliberate manual control but merely incident to the usual shoveling operation.

In the accompanying drawing and description I have shown and described merely the preferred embodiment of the invention simply by way of illustration of the preferred mode of carrying out the invention. However, I recognize that the structure disclosed, as well as its various details may be modified in numerous obvious ways, all without departing from the invention as defined in the accompanying claims.

Having thus described my invention, I claim:

1. A self-clearing shovel comprising a generally rectilinear handle portion and a blade carried at the forward end of said handle portion symmetrically to a plane containing the major longitudinal axis of said handle portion, in combination with a rigid pendulum supported from said shovel for free swinging movement in said plane about a fixed axis extending transversely to said plane in a location adjacent the rear end of said blade, said pendulum having a free end positioned to impact against said blade medially thereof along said plane.

2. A self-clearing shovel as defined in claim 1 wherein the free end of said pendulum is weighted to increase the impact thereof against said shovel blade.

3. A self-clearing shovel comprising a generally rectilinear handle portion and a blade carried at the forward end of said portion and symmetrically to a plane containing the major longitudinal axis of said portion, said blade including a forwardly directed working edge and a generally rectilinear body rearwardly of said edge, said handle portion extending rearwardly from the blade and at an obtuse angle to said blade body, a rigid pendulum supported from said shovel for free swinging movement in said plane about a fixed axis transversely to said plane and adjacent the rear end of said blade, said pendulum including a weighted free end positioned to impact against said blade medially between its front and rear ends, said pendulum being connected to the handle portion of said shovel and being medially curved away from the juncture of said handle portion and the blade to avoid engagement therewith.

References Cited in the file of this patent

UNITED STATES PATENTS

| | | |
|---|---|---|
| 1,532,763 | Kenner | Apr. 7, 1925 |
| 1,764,493 | Ball | June 17, 1930 |
| 2,595,702 | Prevost | May 6, 1952 |